(12) United States Patent  
Kakiuchi

(10) Patent No.: US 9,236,810 B2  
(45) Date of Patent: Jan. 12, 2016

(54) VOLTAGE CONVERSION CIRCUIT, STROBE DEVICE, PHOTOGRAPHING DEVICE AND METHOD OF REDUCING SURGE VOLTAGE

(71) Applicant: RICOH IMAGING COMPANY, LTD., Tokyo (JP)

(72) Inventor: Shinichi Kakiuchi, Saitama (JP)

(73) Assignee: RICOH IMAGING COMPANY, LTD., Tokyo (JP)

( * ) Notice: Subject to any disclaimer, the term of this patent is extended or adjusted under 35 U.S.C. 154(b) by 0 days.

(21) Appl. No.: 14/625,245

(22) Filed: Feb. 18, 2015

(65) Prior Publication Data

US 2015/0236605 A1 Aug. 20, 2015

(30) Foreign Application Priority Data

Feb. 19, 2014 (JP) ................................. 2014-029989

(51) Int. Cl.
| | |
|---|---|
| H05B 41/36 | (2006.01) |
| H02J 7/00 | (2006.01) |
| H02M 5/458 | (2006.01) |
| H05B 37/02 | (2006.01) |

(52) U.S. Cl.
CPC ............... *H02M 5/458* (2013.01); *H05B 37/02* (2013.01)

(58) Field of Classification Search
CPC ........... H05B 41/292; H02M 7/44; H02J 7/00  
USPC ............................... 315/291; 320/166; 363/79  
See application file for complete search history.

(56) References Cited

U.S. PATENT DOCUMENTS

| | | | |
|---|---|---|---|
| 2005/0201125 A1 | 9/2005 | Kakiuchi | |
| 2005/0237043 A1 | 10/2005 | Kakiuchi | |
| 2009/0051330 A1* | 2/2009 | Hoshikawa et al. | ........... 320/166 |
| 2010/0073553 A1 | 3/2010 | Kakiuchi et al. | |
| 2011/0019446 A1* | 1/2011 | Wu et al. | .......................... 363/79 |

FOREIGN PATENT DOCUMENTS

| | | |
|---|---|---|
| JP | 2005-261154 | 9/2005 |
| JP | 2005-312183 | 11/2005 |
| JP | 2005-317278 | 11/2005 |
| JP | 2010-72433 | 4/2010 |

* cited by examiner

*Primary Examiner* — Daniel D Chang  
(74) *Attorney, Agent, or Firm* — Greenblum & Bernstein, P.L.C.

(57) ABSTRACT

A voltage conversion circuit, comprising: a transformer that converts a voltage input to a primary side and outputs a converted voltage from a secondary side; a switching unit configured to switch on/off of electrification of the primary side of the transformer; and a bypass unit configured to transmit charges from the secondary side to the primary side of the transformer when the switching unit is off, so as to reduce a surge voltage caused on the switching unit.

12 Claims, 7 Drawing Sheets

VOLTAGE CONVERSION CIRCUIT, STROBE DEVICE, PHOTOGRAPHING DEVICE AND METHOD OF REDUCING SURGE VOLTAGE

BACKGROUND OF THE INVENTION

The present invention relates to a voltage conversion circuit that converts an input voltage, a strobe device including the voltage conversion circuit, a photographing device including the strobe device, and a method of reducing a surge voltage in the voltage conversion circuit.

In general, a strobe device including a boosting circuit having a boosting transformer and a switching device, a capacitor and a Xenon tube is used as an illuminating device for a photographing device, such as a camera. In recent years, in accordance with downsizing of cameras, a demand for downsizing the strobe device is also increasing. Regarding a boosting transformer of the strobe device, the switching frequency thereof is a low level of 2 kHz to 100 kHz regardless of the fact that the boosting ratio is a large level of 15 to 30 times. Therefore, if inductance of the primary side of at least 10 µH to 20 µH is not secured, it becomes difficult to keep transition of an inrush current at the time of start of switching within a controllable range. If the number of turns of the primary side of the boosting transformer is set to approximately 15 turns to secure such inductance of the primary side, the number of turns of the secondary side increases to 225 to 450 turns and thereby the size of the boosting transformer increases.

If a diameter of a used wiring member of the boosting transformer is decreased to downsize the boosting transformer, a cross sectional area of the wiring member decreases and thereby a direct current resistance component of the wiring member increases. However, since charge of the capacitor needs to be completed within a predetermined time period, an electrification current amount from the start of charge to the end of charge cannot be decreased. Therefore, heat generation by the copper loss increases, the temperature of the boosting transformer itself becomes high, and thereby the boosting efficiency may deteriorate by inducing magnetic saturation. Furthermore, there is a possibility that internal short-circuit in the boosting transformer is caused by melting of the isolation coating of a coil of the boosting transformer due to thermal storage and thereby the boosting transformer becomes unable to function. As described above, in order to downsize the strobe device, it becomes an important point to prevent occurrence of failure caused by heat generation by the boosting transformer.

The major part of cameras in recent years have both the function of capturing a still image and the function of capturing a moving image, and are provided, as a standard function, with the function of constantly displaying a moving image on a liquid crystal display device for video in place of an optical finder. In a camera which does not constantly display a moving image, the charging operation for charging a capacitor of a strobe device and another function are controlled to be performed exclusively. On the other hand, in a camera which constantly displays a moving image, it becomes necessary to control the moving image displaying function and the charging operation for charging the capacitor of the strobe device to be performed concurrently. A problem which would occur in such a situation is that a large amount of switching current caused during the charging affects a circuit which is vulnerable to a magnetic noise leaking from the boosting transformer and thereby noise is superimposed on a moving image. Further, there is a possibility that, since a large amount of current ripple is actually caused on a power line, a power input and a GND level of an electronic circuit are made unstable and thereby noise affecting the entire circuit is caused.

As a method for solving the above described problem, a method for increasing the number of transferring times of current per a unit of time while increasing the switching frequency and decreasing the electrification current amount per one time is known. When such a method is applied to a strobe device, at least inductance on the primary side can be decreased to approximately 0.5 µH to 1 µH by increasing the switching frequency to 300 kHz to 1 MHz. Therefore, in this case, the number of turns on the primary side becomes approximately 5 turns, and the number of turns on the secondary side can also be decreased to 75 to 150 turns. As a result, the boosting transformer can be downsized. Furthermore, since the number of turns can be decreased, downsizing can be realized and the diameter of the wiring line can be increased. Therefore, heat generation by the copper loss can be suppressed to a low level. Furthermore, since the electrification current amount per one switching is decreased, downsizing of peripheral components of the transformer, such as a rectifying diode and the switching device, can also be achieved simultaneously, and thereby the cost down of the entire strobe device can be expected.

However, when the transformer is downsized to some extent or more and the number of turns on the primary side is decreased, magnetic coupling between the transformer and a magnetic circuit, such as a ferrite, constituting a core, becomes sparse, and thereby the leakage magnetic flux of the primary coil becomes relatively large. In this case, various effects may be caused to the circuit. Japanese Patent Provisional Publication No. 2005-317278A (hereafter, referred to as patent document 1) suggests technology where a charged voltage of a capacitor is detected in a strobe device while considering effect by a leakage magnetic flux. The strobe device described in patent document 1 detects the primary voltage inducted on the primary side of the transformer during boosting and judges whether the charge of the capacitor is completed based on the detected primary voltage. In this case, in order to decrease the effect of the noise by the leakage magnetic flux on the primary side, the strobe device is configured to accurately detect the voltage of the capacitor by latching the primary voltage after a predetermined time period has elapsed and thereby the noise level becomes small. As a result, a downsized and inexpensive strobe device can be realized.

SUMMARY OF THE INVENTION

In a strobe device of the type described in patent document 1, when a switching device of a high-speed switching type is used for downsizing, parasitic capacitance of the switching device becomes relatively small. Therefore, a surge voltage caused on the primary side by the leakage inductance of the primary coil during OFF of the switching device becomes further larger, and a possibility that the switching device connected to the primary coil is broken arises.

The present invention is advantageous in that it provides at least one of a voltage conversion circuit, a strobe device, a photographing device and a method of reducing surge voltage capable of preventing breaking of a switching device by a surge voltage while realizing dowsing of the device.

According to an aspect of the invention, there is provided a voltage conversion circuit, comprising: a transformer that converts a voltage input to a primary side and outputs a converted voltage from a secondary side; a switching unit configured to switch on/off of electrification of the primary side of the transformer; and a bypass unit configured to transmit charges from the secondary side to the primary side of the transformer when the switching unit is off, so as to reduce a surge voltage caused on the switching unit.

With this configuration, it becomes possible to cancel a current pulse flowing through the switching unit by causing a current to flow from the secondary side to the primary side of the transformer by the bypass unit, and to reduce the surge voltage. As a result, breaking of the switching unit can be prevented, and thereby the device can be downsized in a safe manner.

The bypass unit may be provided to connect a secondary side hot terminal of the transformer to a secondary side cold terminal of the transformer. Alternatively, the bypass unit may be provided to connect a secondary side hot terminal of the transformer to a primary side hot terminal of the transformer.

The bypass unit may be a capacitor. Capacitance of the capacitor may be substantially equal to parasitic capacitance of the switching unit.

By increasing an operating frequency of the switching unit by approximately five times to ten times an operating frequency of the switching unit in comparison with a case where the voltage conversion circuit operates without the bypass unit while suppressing heat generation of the switching unit, electromagnetic field noise affecting a peripheral circuit may be reduced.

By decreasing a transferring current amount per one switching cycle of the switching unit to ⅕ to 1/10 of a transferring current amount of the switching unit in comparison with a case where the voltage conversion circuit operates without the bypass unit while suppressing heat generation of the switching unit, electromagnetic field noise affecting a peripheral circuit may be reduced.

By increasing an inflow rate of a current flowing in the primary side of the transformer by approximately five times to ten times an inflow rate of a current flowing in the primary side of the transformer in comparison with a case where the voltage conversion circuit operates without the bypass unit while suppressing heat generation of the switching unit, a downsized and lightweight type transformer may be used as the transformer.

By decreasing a volume of all components of an entire voltage conversion circuit to ⅕ to 1/10 of a volume of all components of an entire voltage conversion circuit in comparison with a case where the voltage conversion circuit operates without the bypass unit while suppressing heat generation of the switching unit, cost cutting, downsizing and weight reduction of the voltage conversion circuit may be accomplished.

According to another aspect of the invention, there is provided a strove device, comprising: one of the above described voltage conversion circuits; a power supply that supplies a voltage to the voltage conversion circuit; a capacitor charged by the voltage conversion circuit; and a light-emitting unit configured to emit light by a voltage charged in the capacitor.

According to another aspect of the invention, there is provided a photographing device, comprising the above described strobe device.

According to another aspect of the invention, there is provided a method of reducing a surge voltage in a voltage conversion circuit, comprising: switching on/off a transformer by a switching unit, the transformer converting a voltage input to a primary side of the transformer and outputting a converted voltage; transmitting charges from a secondary side of the transformer to the primary side of the transformer, when the switching unit is off, so as to reduce a surge voltage caused on the switching unit; and increasing an operating frequency of the switching unit by approximately five times to ten times an operating frequency of the switching unit in comparison with a case where the voltage conversion circuit operates without performing the transferring charges from the secondary side to the primary side of the transformer.

BRIEF DESCRIPTION OF THE ACCOMPANYING DRAWINGS

FIGS. 7A to 7C illustrate operation waveforms of another type of strobe devices, in which FIG. 7A illustrates an operation waveform of a conventional strobe device, FIG. 7B illustrates an operation waveform of the strobe device according to the first embodiment, and FIG. 7C illustrates an operation waveform of the strobe device according to the second embodiment.

DETAILED DESCRIPTION OF THE EMBODIMENTS

Hereinafter, a strobe device including a boosting circuit which is an example of a voltage conversion circuit according to an embodiment of the invention is explained with reference to the accompanying drawings. Specifically, in the following, a strobe device mounted on a photographing device, such as a digital camera, is described as an embodiment of the invention.

First Embodiment

Figure 1:
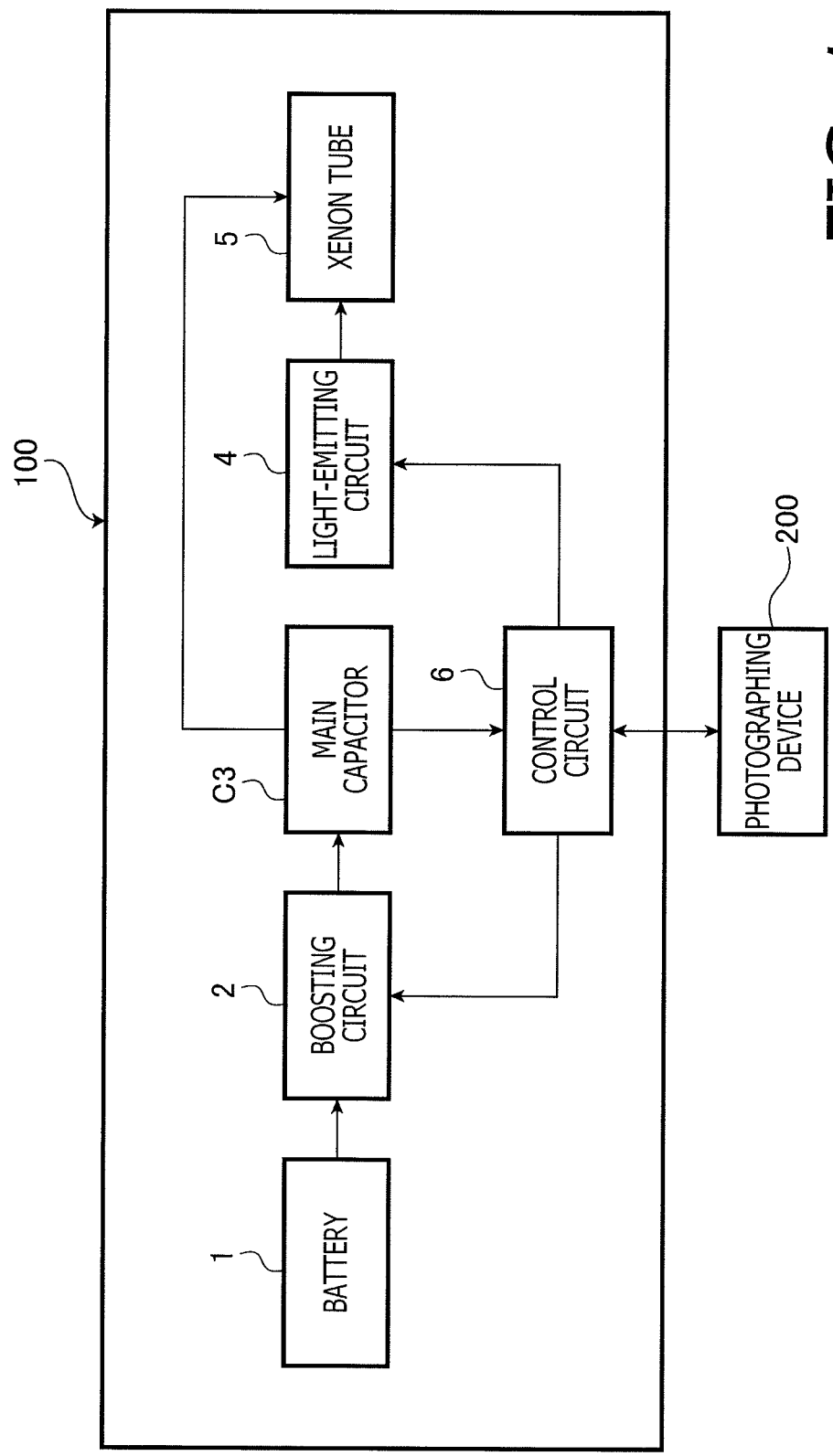
FIG. 1 is a block diagram generally illustrating a strobe device according to a first embodiment of the invention.

FIG. 1 is a block diagram generally illustrating a strobe device 100 according to a first embodiment of the invention. As shown in FIG. 1, the strobe device 100 includes a battery 1, a boosting circuit 2, a main capacitor C3, a light-emitting circuit 4, a Xenon tube 5 and a control circuit 6.

The battery 1 is an energy source for activating the strobe device 100. The battery 1 is a power supply supplying principally a low voltage of approximately 1.5V to 11V, and is connected to the boosting circuit 2. The boosting circuit 2 boosts a voltage supplied from the battery 1, and charges the main capacitor C3. The main capacitor C3 temporarily accumulates energy for causing the Xenon tube 5 to emit light. The main capacitor C3 is charged by a high voltage of 300V or more boosted by the boosting circuit 2. The charged voltage of the main capacitor C3 is divided and is read by the control circuit 6, so that the read voltage is used as information for operation control of the boosting circuit 2. With this configuration, when the charged voltage of the main capacitor C3 reaches a required voltage, the strobe device 100 is able to stop operation of the boosting circuit 2 and to stay in a standby state.

The light-emitting circuit 4 triggers light emission of the Xenon tube 5 by boosting the charged voltage of the main capacitor C3 when the light-emitting circuit 4 is instructed by the control circuit 6 to trigger light emission of the Xenon tube 5 in a state where the main capacitor C3 is charged. The control circuit 6 is connected to a photographing device 200, and controls the boosting circuit 2 and the light-emitting circuit 4 in accordance with a command signal from the photographing device 200.

The photographing device 200 may be one of various types of photographing devices, such as a single-lens reflex digital camera, a compact digital camera, a video camera and a camcorder. The photographing device 200 includes, for example, a photographing lens, a lens driving mechanism, an image pick-up device, a signal processing circuit, an image processing engine, a CPU, a memory and an LCD (Liquid Crystal Display).

Figure 2:
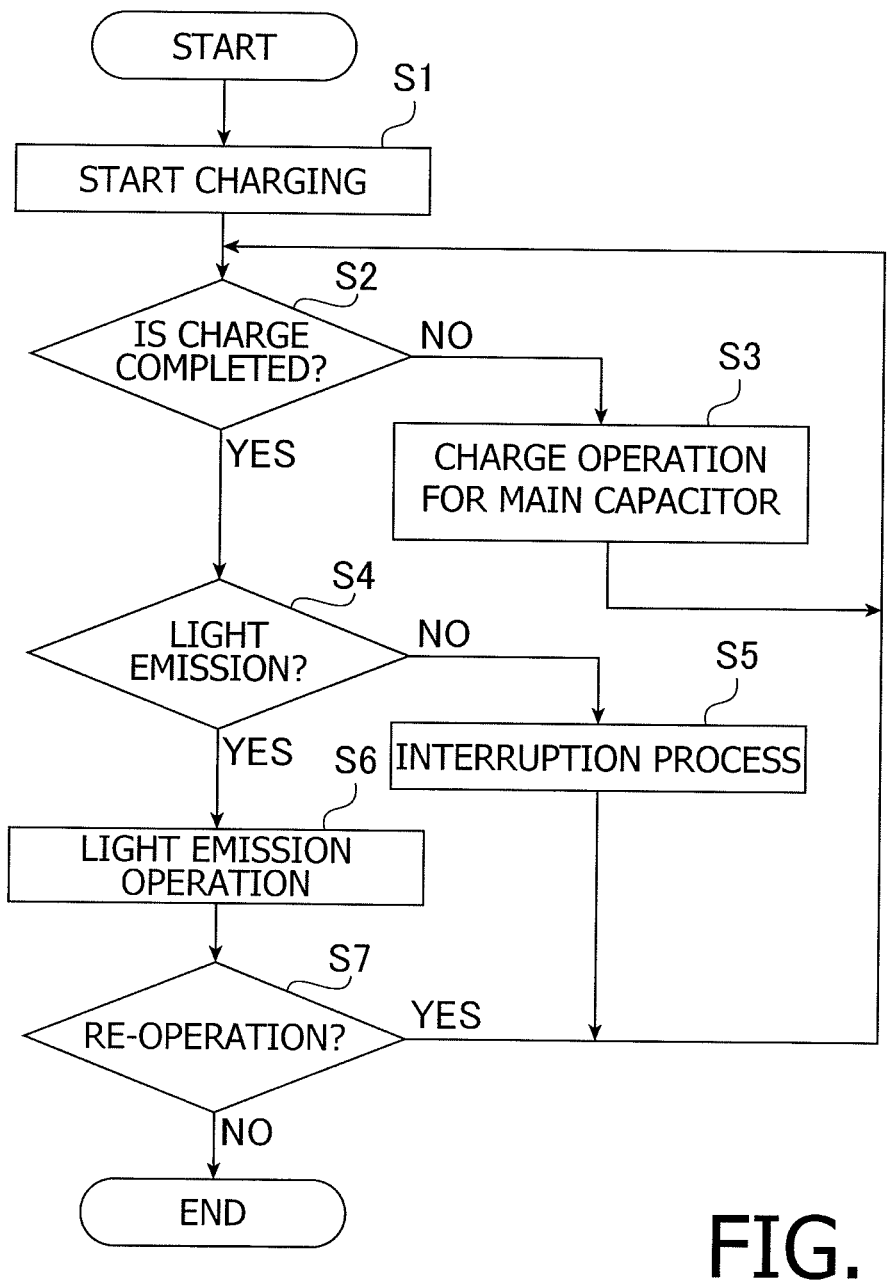
FIG. 2 is a flowchart illustrating a flow of a light emission process by the strobe device according to the first embodiment.

FIG. 2 is a flowchart illustrating a flow of a light emission process by the strobe device 100 according to the first embodiment. The light emission process is executed under control of the control circuit 6 in accordance with an operation of the photographing device 200. First, the control circuit 6 controls the boosting circuit 2 based on a signal commanding start of charge from the photographing device 200, and starts charge of the main capacitor C3 (S1). Then, the control circuit 6 detects the charged voltage of the main capacitor C3, and judges whether or not charge is completed (S2). When charge of the main capacitor C3 is not completed (S2: NO), the control circuit 6 continues charge of the main capacitor C3 (S3). The control circuit 6 continues the charge operation until it is judged in step S2 that charge of the main capacitor C3 is completed.

On the other hand, when charge of the main capacitor C3 is completed (S2: YES), the control circuit 6 judges whether or not a signal commanding emission of light is arriving from the photographing device 200 (S4). When the signal commanding emission of light is not arriving (S4: NO), an interruption process for another operation of the photographing device 200 is executed (S5), and the process returns to step S2 to judge again whether or not charge of the main capacitor C3 is completed. Then, the charge operation in step S3 is repeated until it is judged in step S2 that charge of the main capacitor C3 is completed.

On the other hand, when the signal commanding emission of light is arriving (S4: YES), the control circuit 6 controls the light-mission circuit 4 to cause the Xenon tube 5 to emit light (S6). Thereafter, the control circuit 6 judges whether a signal commanding re-operation is arriving from the photographing device 200 (S7). When re-operation is to be executed (S7: YES), the process returns to step S2 to repeat steps S3 to S7. On the other hand, when the signal commanding re-operation is not arriving (S7: NO), the process is terminated.

Next, a circuit configuration of the strobe device 100 according to the first embodiment is explained with reference to FIG. 3. A power supply terminal J1 and a GND terminal J2 are power input terminals to which the battery 1 is connected. The power supply voltage supplied from the battery 1 is smoothed by a smoothing capacitor C1 for power supply.

The boosting circuit 2 includes a boosting transformer L1, a switching transistor Q1 for boosting and a pull-down resistor R1. The pull-down resistor R1 is provided to pull down a gate of the switching transistor Q1 to GND in a non-operation state so as to prevent the switching transistor Q1 from accidentally turning ON and thereby letting a large amount of current flow through the switching transistor Q1. By switching a primary coil of the boosting transformer L1 by the switching transistor Q1, a high voltage switching pulse corresponding to a turn ratio is generated on a secondary coil. The boosting is performed by rectifying the pulse to a DC current by a rectifying diode D1.

The main capacitor C3 is charged by the voltage rectified to DC by the rectifying diode D1. The charged voltage of the main capacitor C3 is divided by a high-voltage side dividing resistor R4 and a low-voltage side dividing resistor R5, and is detected by the control circuit 6. With this configuration, the control circuit 6 is able to recognize a charged state of the main capacitor C3. As the high-voltage side dividing resistor R4 and the low-voltage side dividing resistor R5, resistors having a sufficiently large resistance and a sufficiently high degree of electrical tolerance are use so that the resistors R4 and R5 are not broken in state where a high-voltage of 300V is applied to the main capacitor C3.

The light-emitting circuit 4 includes a capacitor-charging resistor R2, a triggering capacitor C2, a triggering transformer L2, a light-emission switching transistor Q2 and a pull-down resistor R3. The pull-down resistor R3 is provided to pull down a gate of the light-emission switching transistor Q2 to GND in a non-operation state so as to prevent the light-emission switching transistor Q2 from accidentally turning ON and thereby outputting a triggering pulse. The triggering capacitor C2 is charged by a current through the capacitor-charging resistor R2 as the main capacitor C3 is charged. The time constant of the resistor R2 and the capacitor C2 is set so that the charged state of the triggering capacitor C2 becomes the maximum when charge of the main capacitor C3 is completed. The light-emission switching transistor Q2 short-circuits a common terminal of the triggering transformer L2 to GND when charge of the main capacitor C3 is completed, and applies charges accumulated in the triggering capacitor C2 to a primary coil of the triggering transformer L2. As a result, the triggering transformer L2 generates, on a secondary coil, a high voltage pulse whose voltage is 50 to 100 times the primary side voltage according to a turn ratio, and thereby applies a triggering voltage to the Xenon tube 5.

The Xenon tube 5 is excited and emits light by being applied the triggering voltage in a state where the voltage of the main capacitor C3 is applied between an anode and a cathode of the Xenon tube 5.

Figure 4:
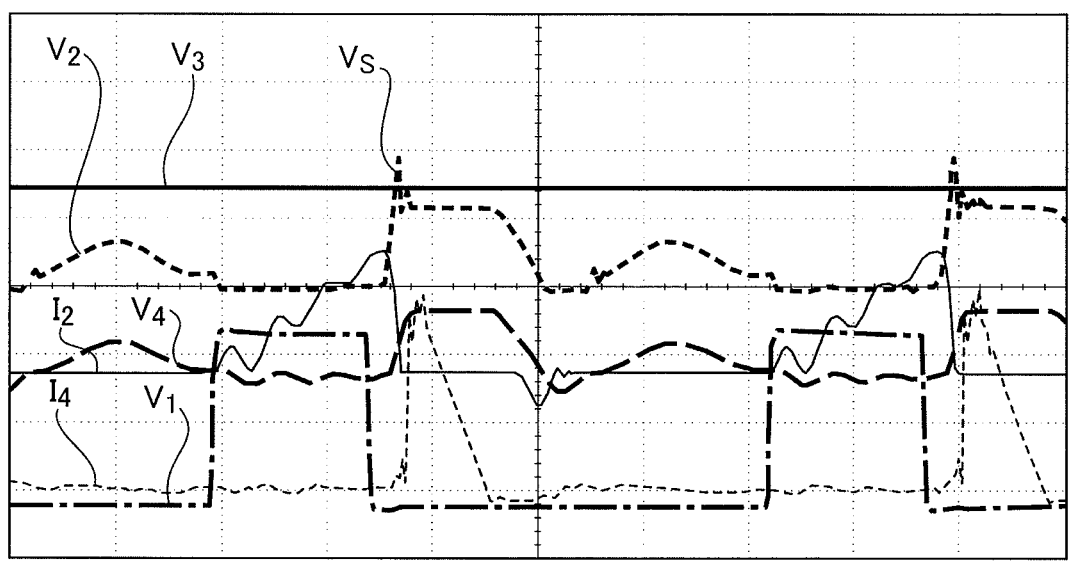
FIG. 4 is a diagram illustrating operation waveforms of the strobe device according to the first embodiment.

FIG. 4 is a diagram illustrating operation waveforms of the strobe device 100. In FIG. 4, division scales of respective waveforms are $V_1$=2V/div, $V_2$=20V/div, $V_3$=2V/div, $V_4$=400V/div, $I_2$=2A/div, $I_4$=50 mA/div, and 500 ns/div. As shown in FIG. 4, since, in an initial state, a voltage $V_1$ of a gate side tap TP1 of the switching transistor Q1 for boosting is low, the switching transistor Q1 for boosting is in an OFF state. When the voltage $V_1$ of the tap TP1 becomes high, the switching transistor Q1 for boosting turns ON, and a tap TP2 is shorted to GND. At this time, a current $I_2$ at the tap TP2 increases in accordance with inductance of the primary coil of the boosting transformer L1, and this state continues until the voltage $V_1$ becomes low again and thereby the switching transistor Q1 for boosting turns OFF. When the voltage $V_1$ becomes low again and thereby the switching transistor Q1 for boosting turns OFF, ideally the current is cut off immediately and a magnetic flux caused thereby is transmitted to the secondary coil. As a result, a hot side tap TP4 of the secondary coil of the boosting transformer L1 outputs a high voltage ($V_4$) according to a turn ratio of the boosting transformer L1.

The voltage at which the rectifying diode D1 turns ON changes up or down depending on a cathode side voltage of the rectifying diode D1, i.e., the voltage $V_5$ of a hot side tap TP5 of the main capacitor C3. Specifically, as the voltage $V_5$ of the tap TP5 increases, the voltage at which the rectifying diode D1 turns ON increases.

When an ON time of the switching transistor Q1 for boosting (i.e., an electrification ON time of the primary coil of the boosting transformer L1) is controlled to be kept constant, the current flowing through the boosting transformer L1 is constant and thereby the magnetic flux flowing through the boosting transformer L1 becomes constant. Therefore, as the voltage $V_5$ becomes low, the current $I_4$ flowing through the tap TP4 becomes large. As the voltage $V_5$ becomes high, the current $I_4$ becomes small.

However, in an actual case of charge control of the main capacitor C3, the ON time of the switching transistor Q1 for boosting is increased as the voltage $V_5$ of the tap TP5 becomes high so that charge can be completed as soon as possible. Further, in order to suppress an inrush current at a time of start of charge, the ON time of the switching transistor Q1 for boosting is decreased as the voltage $V_5$ becomes low. Under such control, the current flowing through the primary coil of the boosting transformer L1 becomes large as the voltage $V_5$ becomes high, and similarly the magnetic flux flowing through the inside of the boosting transformer L1 increases accordingly. As the voltage $V_5$ becomes low, the current $I_4$ flowing through the tap TP4 becomes small, and similarly the magnetic flux flowing through the inside of the boosting transformer L1 becomes small. The current $I_4$ is adjusted in such a manner that the current $I_4$ becomes an acceptable maximum current when the voltage $V_5$ is high, and, for a lower value of the voltage $V_5$, the current $I_4$ is adjusted in a manner where the current flowing through the primary coil of the boosting transformer L1 is suppressed so that the current $I_4$ does not exceed an acceptable current at each state. Therefore, in comparison with a case where an ON time of the switching transistor Q1 for boosting is controlled to be constant, a large degree of electric power can be transmitted from the primary side to the secondary side of the boosting transformer L1 in a short time.

When the voltage $V_1$ becomes low again and thereby the switching transistor Q1 for boosting turns OFF, the time which elapses from start to end of cutting off the current $I_2$ is approximately 100 nsec. Since the time required for the cutting off the current $I_2$ is short, change of the current occurs rapidly, and thereby change of the magnetic flux also occurs rapidly. The timing of start of cutting off the current is equal to the time when the secondary coil of the boosting transformer L1 starts to generate a voltage, and the timing of end of cutting off the current is equal to the time when the voltage of the secondary coil of the boosting transformer L1 becomes equal to the voltage $V_5$. That is, this time corresponds to the time which elapses from start of application of a voltage to the rectifying diode D1 to turning ON of the rectifying diode D1 in the forward direction. Although, during this period of time, a current tries to flow toward the tap TP4 via the magnetic flux, actually the current does not flow through the tap TP4 until the rectifying diode D1 turns ON, and only the voltage becomes high in response to increase of the magnetic flux. When the voltage reaches a value at which the rectifying diode D1 turns ON, the current immediately flows toward the tap TP4.

When the switching transistor Q1 turns OFF, the energy accumulated in the primary coil of the boosting transformer L1, is transmitted to the secondary side. However, energy accumulated in a leakage inductance Le caused by a leak magnetic flux on the primary side is not transmitted to the secondary side. Therefore, as shown by a solid line arrow in FIG. 3, a current continues to flow from the leakage inductance Le to a parasitic capacitance Cds of the switching transistor Q1 for boosting. As a result, the voltage $V_2$ of the tap TP2 which is a terminal of the primary coil increases and thereby a surge voltage $V_S$ occurs.

This is caused by a phenomenon where the energy accumulated in the leakage inductance Le by the current resonates with a coil and a distributed capacitance. Regarding the wording "a coil and a distributed capacitance", when an electric circuit is designed by adequately considering disposition of components and a wiring length, the major part of the "a coil and a distributed capacitance" is occupied by the parasitic capacitance Cds of the switching transistor Q1 for boosting. Therefore, when calculation is made while excluding indefinite factors caused in a circuit, the maximum value Vsp of the surge voltage Vs is obtained by a simplified expression indicated below, where Ip denotes the maximum value of the current $I_2$. As shown in the following expression, when a circuit factor of the second term is constant, the maximum value Vsp of the surge voltage increases or decreases depending on the magnitude of Ip.

$$Vsp \approx Ip \times \sqrt{Le/Cds}$$

Figure 3:
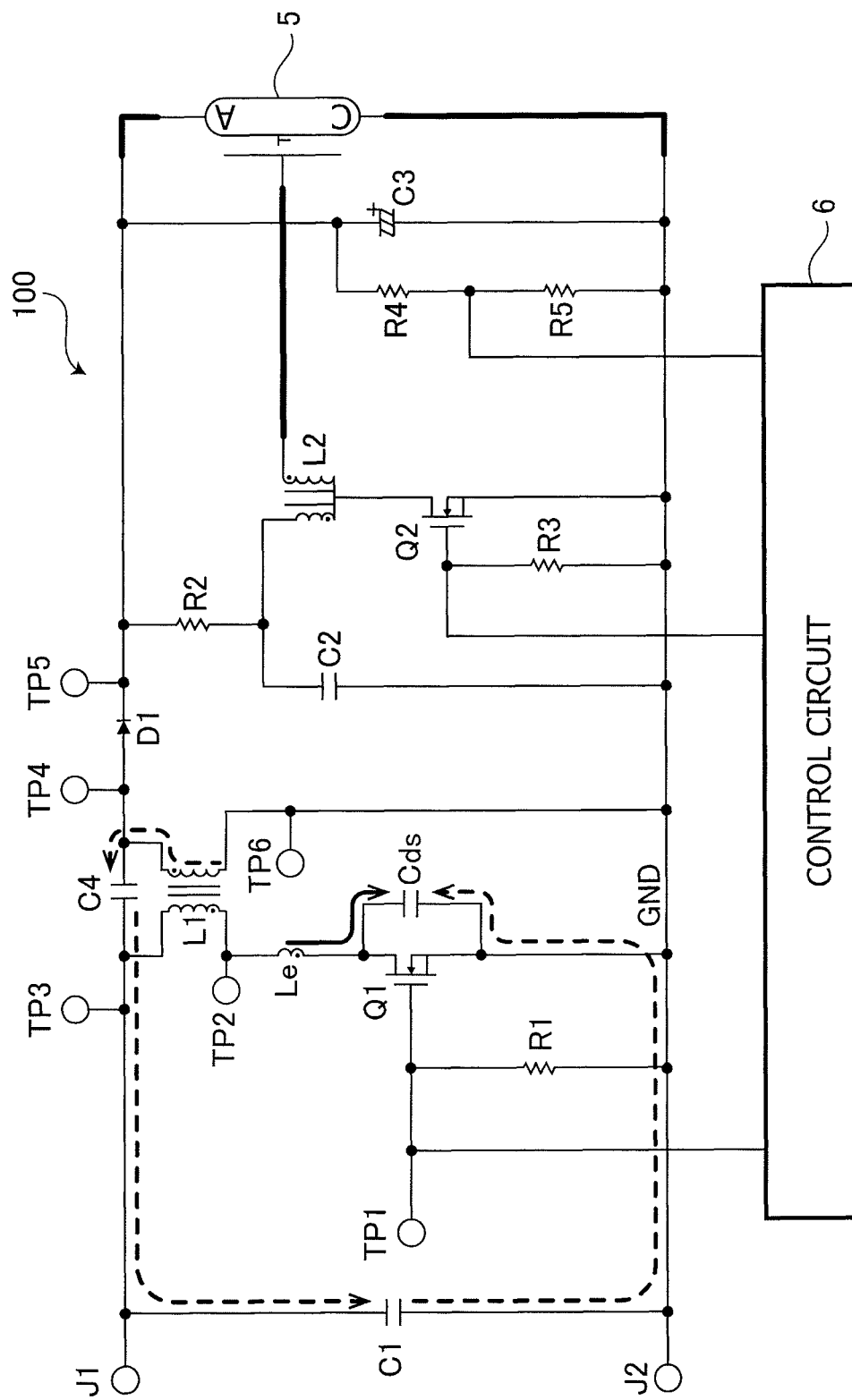
FIG. 3 is a circuit diagram of the strobe device according to the first embodiment.

For this reason, as shown in FIG. 3, the boosting circuit 2 according to the first embodiment includes a bypass capacitor C4 which connects the hot side tap TP3 of the primary coil of the boosting transformer L1 to the hot side tap TP4 of the secondary coil of the boosting transformer L1. With this configuration, as indicated by a dashed line arrow in FIG. 3, a current pulse which has passed the bypass capacitor C4 from the hot side tap TP4 of the secondary coil of the boosting transformer L1 flows into the cold side of the parasitic capacitance Cds of the switching transistor Q1 for boosting via the smoothing capacitor C1. As a result, it becomes possible to cancel a current pulse injected by the leakage inductance Le of the primary coil into the hot side of the parasitic capacitance Cds of the switching transistor Q1.

In consideration of canceling the parasitic capacitance Cds, the capacitance of the bypass capacitor C4 is considered to be Cds≅C4, and is obtained by the following expression.

$$C4 \approx (Ip/Vsp)^2 \times Le$$

The parasitic capacitance Cds is obtained by subtracting a feedback capacitance Crss from an output capacitance Coss, and is expressed by the following expression.

$$Cds \approx Coss - Crss$$

It should be noted that the leakage inductance Le is considered to be 0.3% to 0.5% of the inductance of the primary coil.

Second Embodiment

Hereafter, a strobe device 100A according to a second embodiment of the invention is described. Since a general configuration and a light emission process according to the second embodiment are substantially the same as those of the first embodiment, explanations thereof are omitted. In the following, to elements which are the same as those of the first embodiment, same reference numbers are assigned.

Figure 5:
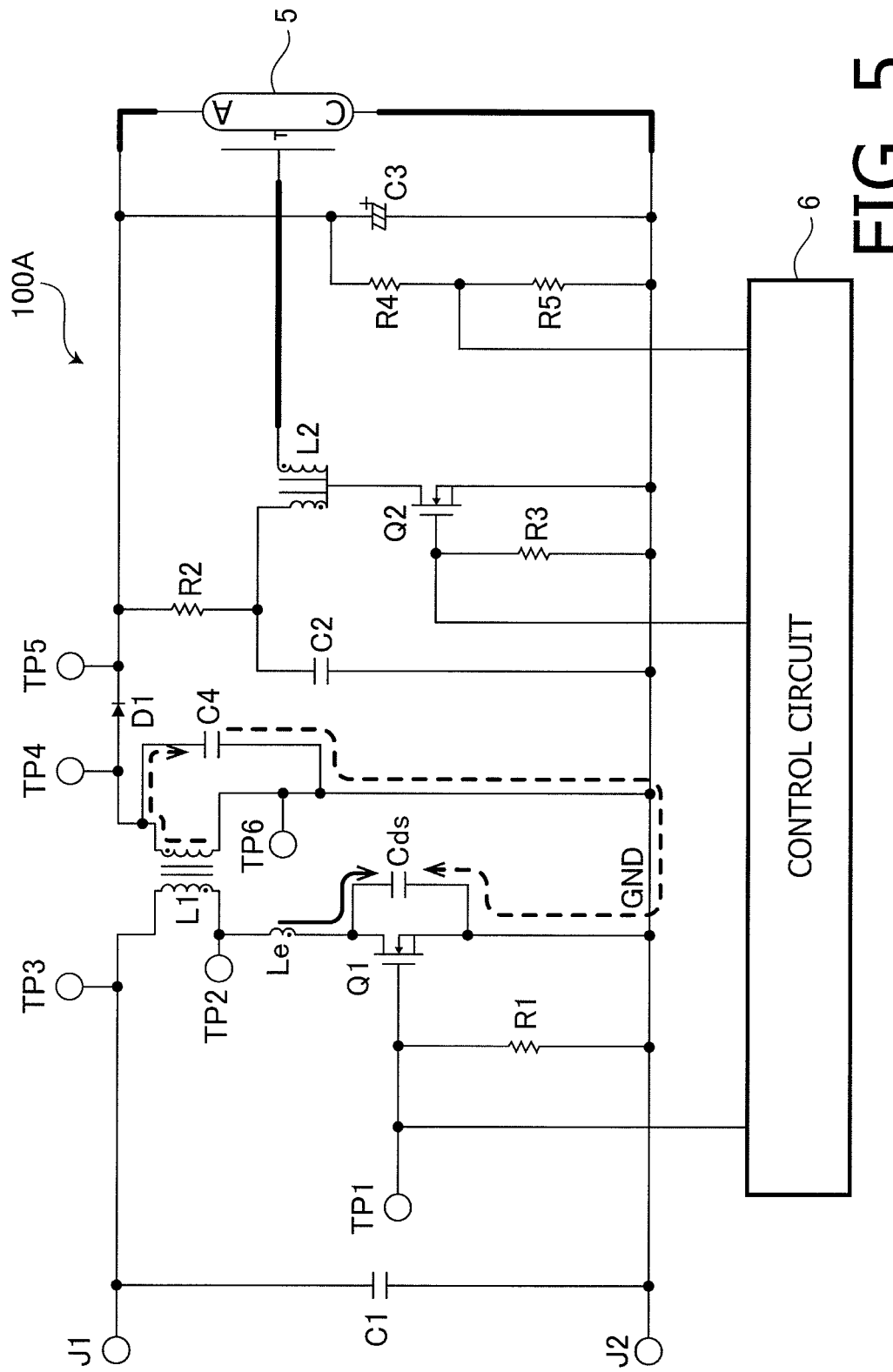
FIG. 5 is a circuit diagram of a strobe device according to a second embodiment.

FIG. 5 is a circuit diagram of the strobe device 100A according to the second embodiment. The difference with respect to the strobe device 100 according to the first embodiment is that the bypass capacitor C4 is provided to connect the hot side tap TP4 of the secondary coil of the boosting transformer L1 to a cold side tap TP6 of the secondary coil of the boosting transformer L1. With this configuration, as shown by a dashed line arrow in FIG. 5, a current pulse is transmitted from the tap TP4 to the tap TP6 via the bypass capacitor C4, and flows into the cold side of the parasitic capacitance Cds which is produced when the switching transistor Q1 is OFF. As a result, the current pulse which is injected into the hot side of the parasitic capacitance Cds by the leakage inductance Le of the primary side can be cancelled.

Advantageous Effects

Figure 6A:
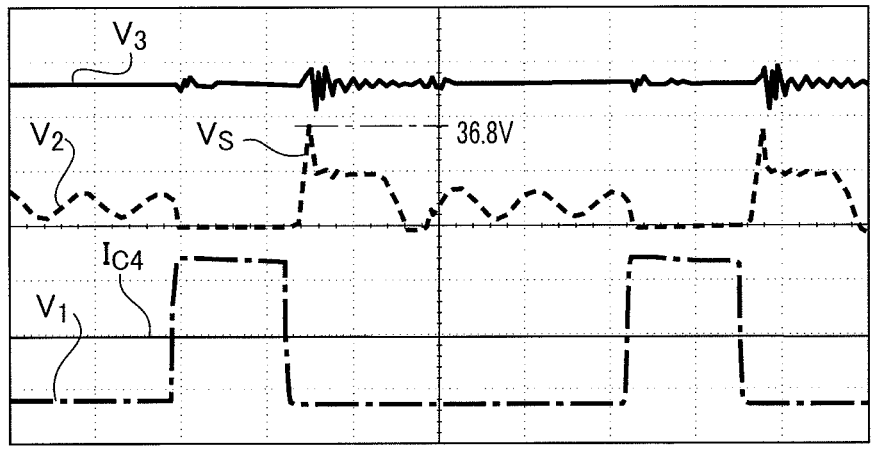
FIG. 6A illustrates an operation waveform of a conventional strobe device.
Figure 6B:
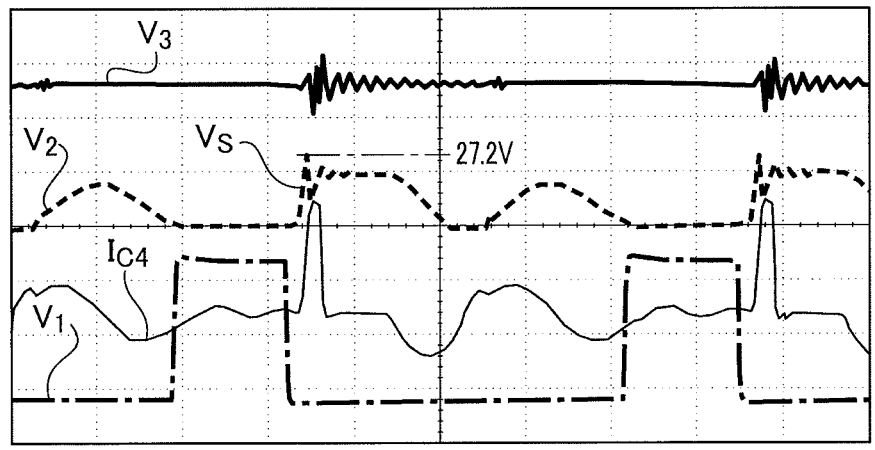
FIG. 6B illustrates an operation waveform of the strobe device according to the first embodiment.
Figure 6C:
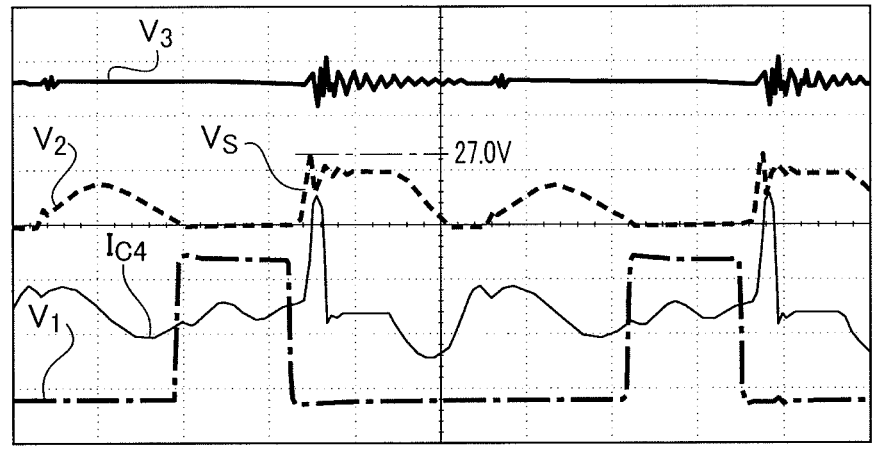
FIG. 6C illustrates an operation waveform of the strobe device according to the second embodiment.

Next, advantageous effects of the strobe device according to the first and second embodiments of the invention are explained with reference to FIGS. 6A-6C and 7A-7C. FIG. 6A illustrates an operation waveform of a conventional strobe device, FIG. 6B illustrates an operation waveform of the strobe device 100 according to the first embodiment, and FIG. 6C illustrates an operation waveform of the strobe device 100A according to the second embodiment. In each of FIGS. 6A-6C, the division scales of the respective waveforms are $V_1$=2V/div, $V_2$=20V/div, $V_3$=5V/div, $I_{c4}$=100 mA/div, and 500 ns/div.

As described above, in the strobe device 100 according to the first embodiment, since the current pulse ($I_{c4}$) flows toward the hot side tap Tp3 of the primary coil of the boosting transformer L1 from the hot side tap TP4 of the secondary coil of the boosting transformer L1 via the bypass capacitor C4, the current pulse injected into the hot side of the parasitic capacitance Cds of the switching transistor Q1 by the leakage inductance Le of the primary coil is cancelled. As a result, as shown in FIG. 6B, the peak ($V_{SP}$) of the surge voltage Vs becomes lower by approximately 10V than the conventional surge voltage shown in FIG. 6A.

In the strobe device 100A according to the second embodiment, since the current pulse ($I_{c4}$) flows from the hot side tap TP4 of the secondary coil of the boosting transformer L1 to the cold side tap TP6 of the secondary coil of the boosting transformer L1 via the bypass capacitor C4, the current pulse injected into the hot side of the parasitic capacitance Cds of the switching transistor Q1 by the leakage inductance Le of the primary coil is cancelled. As a result, also in the second embodiment, as shown in FIG. 6C, the peak ($V_{SP}$) of the surge voltage Vs becomes lower by approximately 10V than the conventional surge voltage shown in FIG. 6A.

Figure 7A:
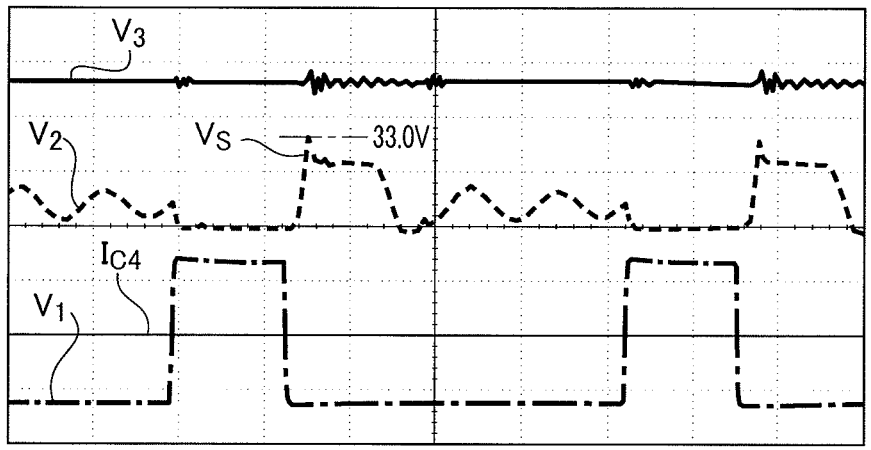
Figure 7B:
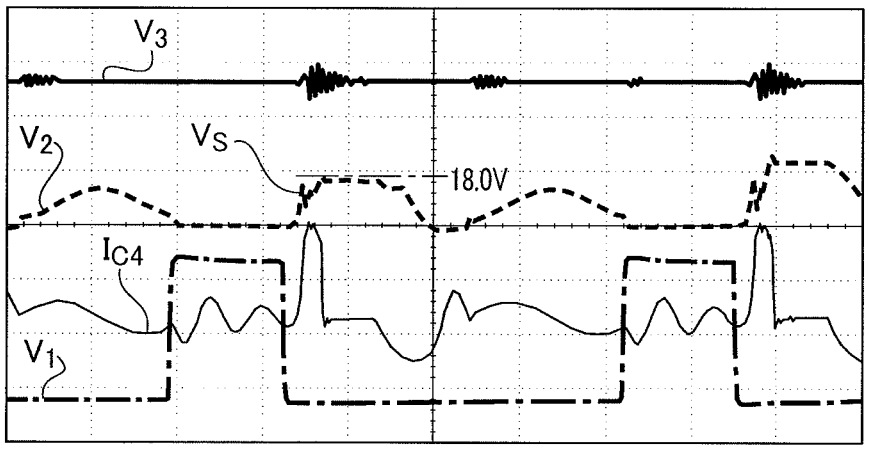
Figure 7C:
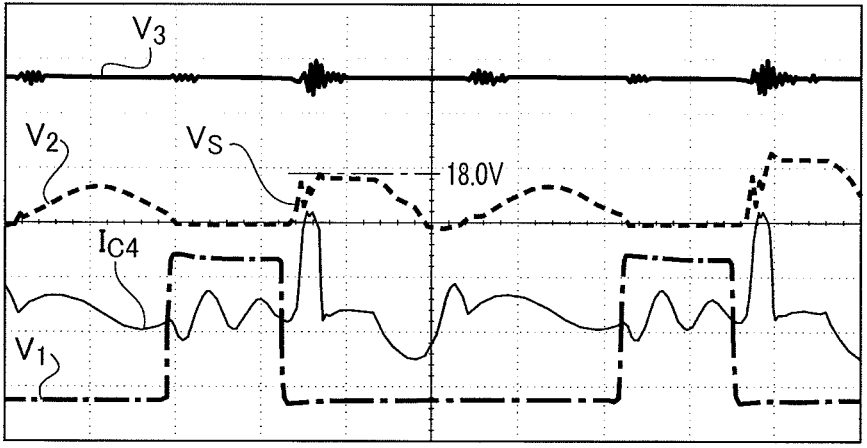

For the purpose of showing the difference in the surge voltage Vs caused by the leakage inductance Le, the coil and the distributed capacitance (namely Cds), FIGS. 7A-7C illustrate operation waveforms which are generated by using components having different specifications in the same circuit configurations as those of the FIGS. 6A-6C, respectively. FIG. 7A illustrates the operation waveform of the conventional strobe device, FIG. 7B illustrates the operation waveform of the strobe device according to the first embodiment, and FIG. 7C illustrates the operation waveform of the strobe device according to the second embodiment. In each of FIGS. 7A-7C, the division scales of the respective waveforms are $V_1$=2V/div, $V_2$=20V/div, $V_3$=5V/div, $I_{c4}$=100 mA/div, and 500 ns/div.

As shown in FIGS. 7B and 7C, in the strobe device according to the first and second embodiments, the peak ($V_{SP}$) of the surge voltage $V_S$ becomes lower by approximately 15V than the surge voltage $V_S$ in the conventional strobe device shown in FIG. 7A.

As described above, according to the first and second embodiments, by causing the current pulse to flow into the cold side of the parasitic capacitance Cds from the hot side tap TP4 of the secondary coil of the boosting transformer L1, the current pulse injected by the leakage inductance Le can be cancelled and thereby the surge voltage can be reduced. As a result, it becomes possible to prevent the switching transistor Q1 from being broken by the surge voltage caused by the leakage inductance of the primary side and the distributed capacitance on the circuit including the parasitic capacitance of the switching transistor Q1, which affects the circuit at the time of switching, and thereby it becomes possible to provide a safe strobe device.

Furthermore, since the surge voltage can be decreased, it becomes possible to decrease the amount of the electrified current per one switching cycle while using a high-speed switching type transistor having a small parasitic capacitance as the switching transistor Q1 and thereby heightening the switching frequency and suppressing heat generation of the switching transistor Q1. Specifically, it becomes possible to increase the switching frequency to approximately 5 times to 10 times the switching frequency in the case where the bypass capacitor is not used, to relatively decrease the transferring current amount per one switching cycle to approximately ⅕ to 1/10 (0.2 times to 0.1 times) and to relatively increase the flowing speed of the current flowing into the primary side.

Furthermore, since the number of turns of the boosting transformer L1 can be decreased without considering the effect by the increase of the leakage inductance of the boosting transformer L1 and peripheral components having a low degree of power tolerance can be used, downsizing of the boosting circuit 2 can be realized. Specifically, it becomes possible to relatively decrease the volume of all the components to ⅕ to 1/10 (0.2 times to 0.1 times) of the case where the bypass capacitor is not used. Accordingly, cost cutting can also be realized.

The foregoing is the explanation about the embodiments of the invention. The invention is not limited to the above described embodiments, but can be varied in various ways within the scope of the invention. For example, the invention includes a combination of embodiments explicitly described in this specification and embodiments easily realized from the above described embodiment.

In the above described embodiments, the strobe device mounted on the photographing device 200 is explained; however, the invention may be applied to an external strobe device which is detachably attached to the photographing device 200. The voltage conversion circuit of the above described embodiment may be applied not only to the strobe device but also to various types of devices.

This application claims priority of Japanese Patent Application No. 2014-029989, filed on Feb. 19, 2014. The entire subject matter of the applications is incorporated herein by reference.

What is claimed is:

1. A voltage conversion circuit, comprising:
   a transformer that converts a voltage input to a primary side and outputs a converted voltage from a secondary side;
   a switch configured to switch on/off of electrification of the primary side of the transformer; and
   a bypass configured to transmit charges from the secondary side to the primary side of the transformer when the switch is off, so as to reduce a surge voltage caused on the switch.

2. The voltage conversion circuit according to claim 1, wherein the bypass is provided to connect a secondary side hot terminal of the transformer to a secondary side cold terminal of the transformer.

3. The voltage conversion circuit according to claim 1, wherein the bypass is provided to connect a secondary side hot terminal of the transformer to a primary side hot terminal of the transformer.

4. The voltage conversion circuit according to claim 1, wherein the bypass is a capacitor.

5. The voltage conversion circuit according to claim 4, wherein capacitance of the capacitor is substantially equal to parasitic capacitance of the switch.

6. The voltage conversion circuit according to claim 1, wherein by increasing an operating frequency of the switch by approximately five times to ten times an operating frequency of the switch in comparison with a case where the voltage conversion circuit operates without the bypass while suppressing heat generation of the switch, electromagnetic field noise affecting a peripheral circuit is reduced.

7. The voltage conversion circuit according to claim 1, wherein by decreasing a transferring current amount per one switching cycle of the switch to $1/5$ to $1/10$ of a transferring current amount of the switch in comparison with a case where the voltage conversion circuit operates without the bypass while suppressing heat generation of the switch, electromagnetic field noise affecting a peripheral circuit is reduced.

8. The voltage conversion circuit according to claim 1, wherein by increasing an inflow rate of a current flowing in the primary side of the transformer by approximately five times to ten times an inflow rate of a current flowing in the primary side of the transformer in comparison with a case where the voltage conversion circuit operates without the bypass unit while suppressing heat generation of the switch, a downsized and lightweight type transformer is used as the transformer.

9. The voltage conversion circuit according to claim 1, wherein by decreasing a volume of all components of an entire voltage conversion circuit to $1/5$ to $1/10$ of a volume of all components of an entire voltage conversion circuit in comparison with a case where the voltage conversion circuit operates without the bypass while suppressing heat generation of the switch, cost cutting, downsizing and weight reduction of the voltage conversion circuit are accomplished.

10. A strobe device, comprising:
a voltage conversion circuit that includes
a transformer that converts a voltage input to a primary side and outputs a converted voltage from a secondary side,
a switch configured to switch on/off of electrification of the primary side of the transformer, and
a bypass configured to transmit charges from the secondary side to the primary side of the transformer when the switch is off, so as to reduce a surge voltage caused on the switch;
a power supply that supplies a voltage to the voltage conversion circuit;
a capacitor charged by the voltage conversion circuit; and
a light-emitter unit configured to emit light by a voltage charged in the capacitor.

11. The strobe device according to claim 10, configured as a photographing device.

12. A method of reducing a surge voltage in a voltage conversion circuit, comprising:
switching on/off a transformer by a switch, the transformer converting a voltage input to a primary side of the transformer and outputting a converted voltage;
transmitting charges from a secondary side of the transformer to the primary side of the transformer, when the switch is off, so as to reduce a surge voltage caused on the switch; and
increasing an operating frequency of the switch by approximately five times to ten times an operating frequency of the switch in comparison with a case where the voltage conversion circuit operates without performing the transferring charges from the secondary side to the primary side of the transformer.

* * * * *